June 27, 1967  E. H. COLLINS  3,327,747
METHOD OF AND APPARATUS FOR KERFLESS CUTTING OF WOOD
Filed Oct. 24, 1965  5 Sheets-Sheet 1
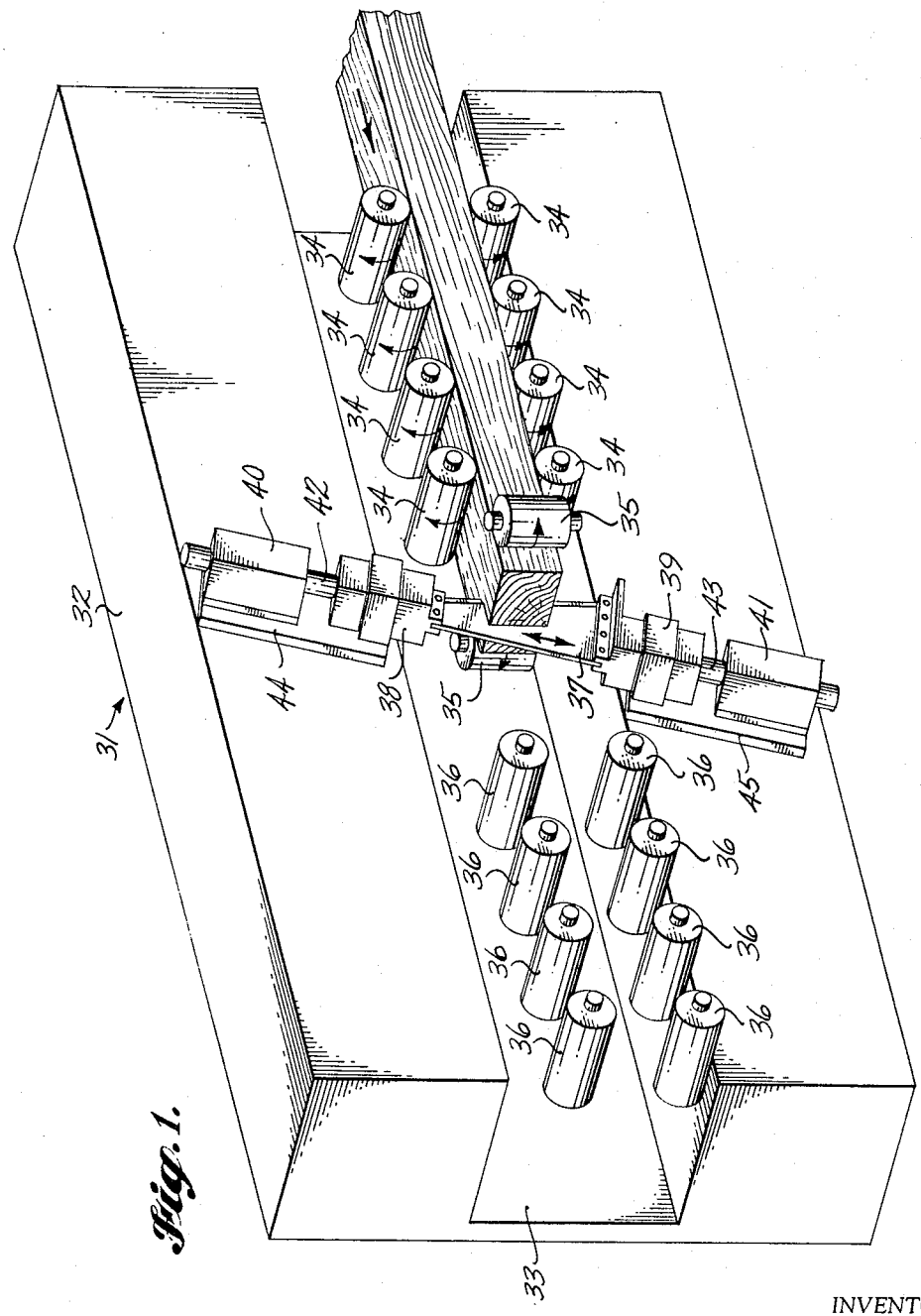
INVENTOR.
ERNEST H. COLLINS
BY Leslie G. Noller &
Daniel C. Block
ATTORNEYS

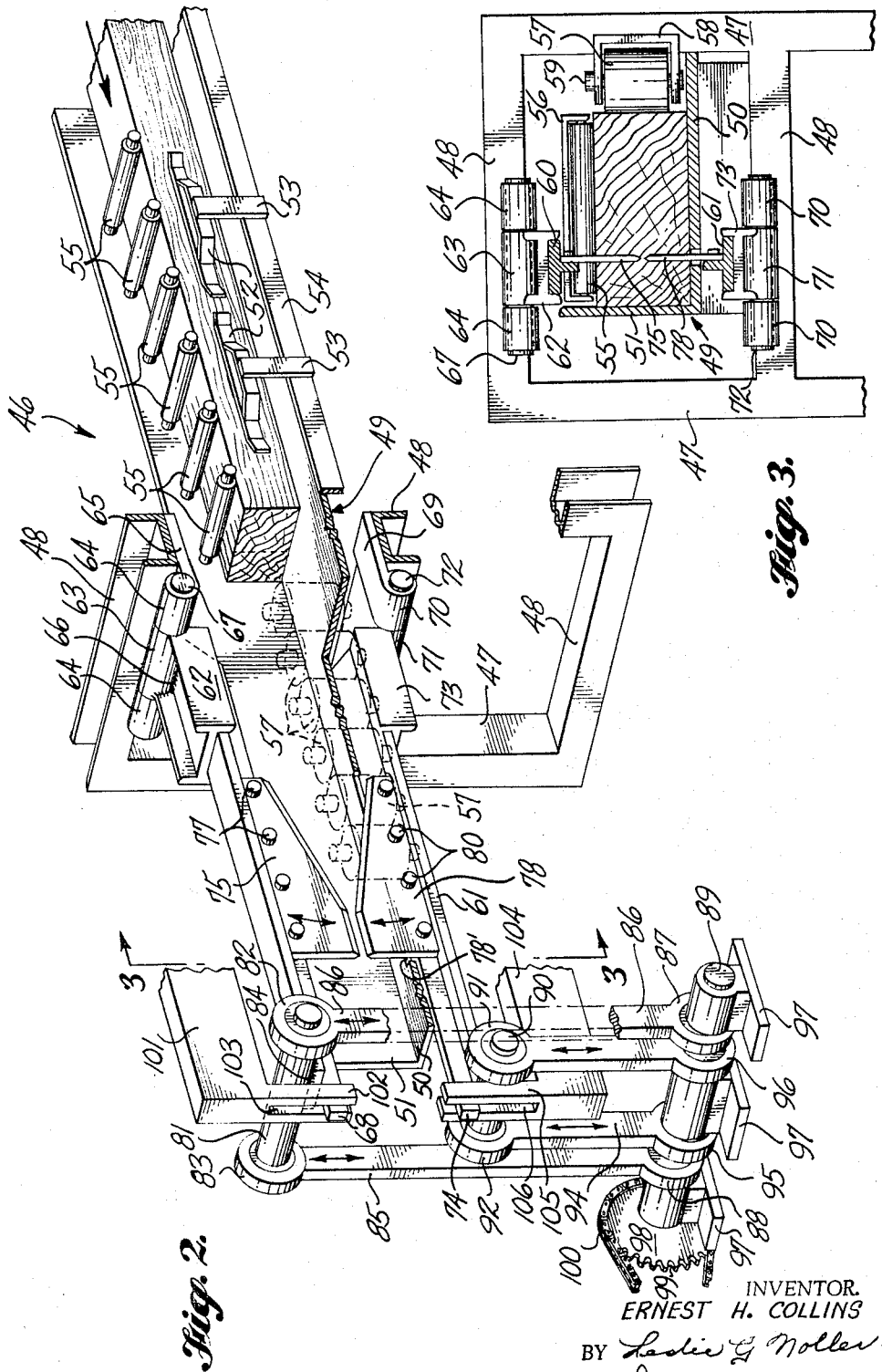

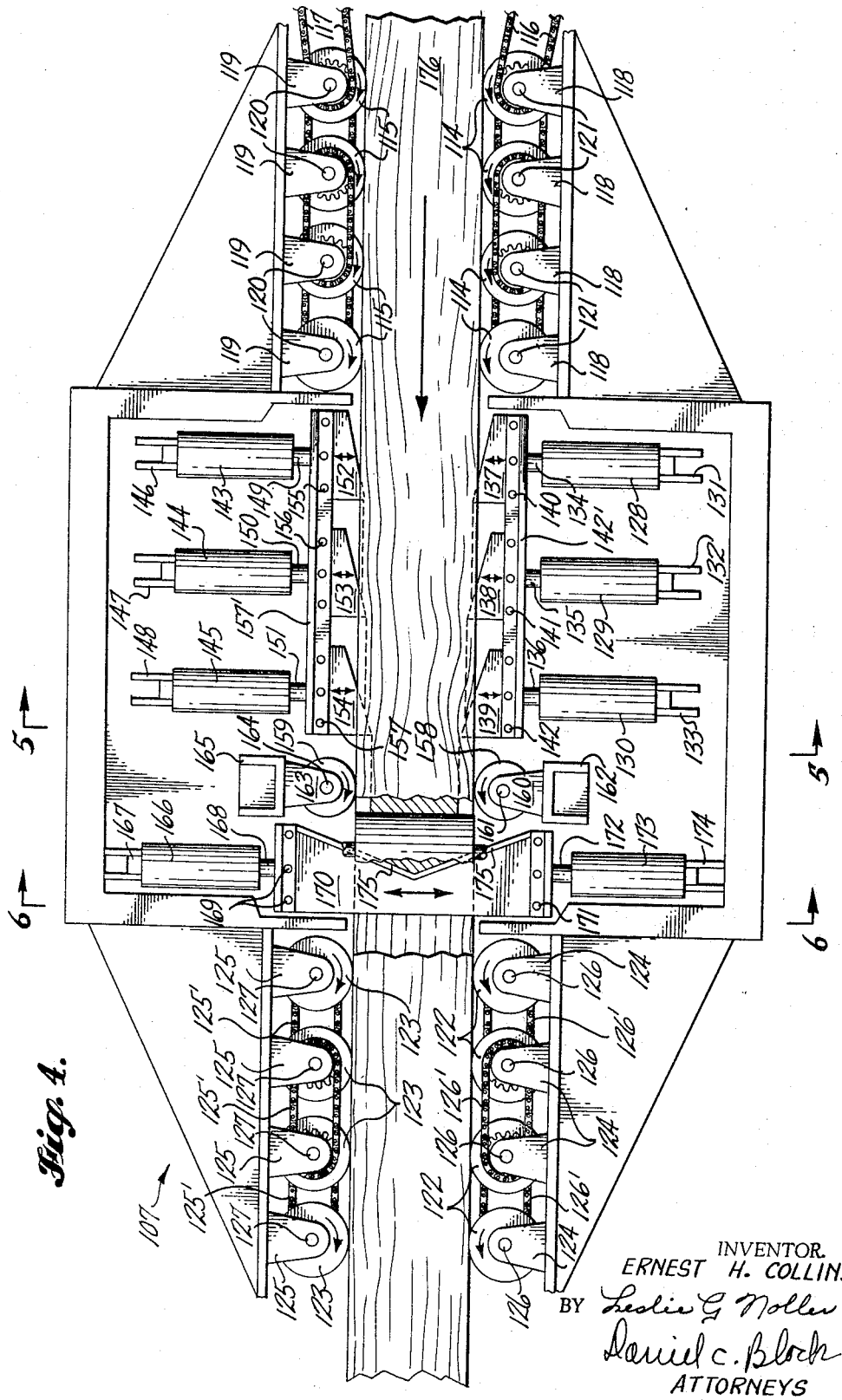

June 27, 1967  E. H. COLLINS  3,327,747
METHOD OF AND APPARATUS FOR KERFLESS CUTTING OF WOOD
Filed Oct. 24, 1965  5 Sheets-Sheet 4

INVENTOR.
ERNEST H. COLLINS
BY Leslie G. Noller +
Daniel C. Block
ATTORNEYS

June 27, 1967 E. H. COLLINS 3,327,747
METHOD OF AND APPARATUS FOR KERFLESS CUTTING OF WOOD
Filed Oct. 24, 1965 5 Sheets-Sheet 5

INVENTOR.
ERNEST H. COLLINS
BY Leslie G. Noller &
Daniel C. Block
ATTORNEYS

United States Patent Office 3,327,747
Patented June 27, 1967

3,327,747
METHOD OF AND APPARATUS FOR KERFLESS CUTTING OF WOOD
Ernest H. Collins, Portland, Oreg., assignor to Weyerhaeuser Company, Tacoma, Wash., a corporation of Washington
Filed Oct. 24, 1965, Ser. No. 504,473
7 Claims. (Cl. 144—312)

This invention relates to a method of and apparatus for cutting wood without forming a kerf. More specifically, this invention relates to the method of and apparatus for cutting wood without producing sawdust.

In the lumber industry, it is common practice to cut a log longitudinally into a plurality of rectangular cants. These cants are usually passed through additional saws that form the boards into their final size for shipment to the ultimate consumer. These additional saws are usually in the form of circular saws, band saws or gang saws. These saws are provided with saw teeth that form a kerf in the wood. The kerf is removed as sawdust. It is estimated that up to about 20% of the volume of every log formed into lumber is wasted in the form of sawdust.

Further waste occurs in planing because of the necessity for sawing the wood substantially oversize due to the uneven thickness and rough surface produced by conventional saws.

Much time and expense have been expended by the lumber industry in an effort to reduce or eliminate the amount of sawdust formed in the manufacture of lumber. One such attempt is shown and described in Patent No. 2,356,324, issued to Kendle et al. This patented device employs the idea of splitting lumber by pushing a board past a cutting blade. This method of cutting boards is unsatisfactory because the cut edges of the produced lumber are usually rough and must be further sanded or planed to produce a commercially accepted board. Another reason that this apparatus is unsatisfactory is that the boards produced vary in thickness from place to place since the board will usually split along a plane that is not parallel to the sides of the board being split. Accordingly, a board produced by the splitting method may very well be two inches thick in one spot and only one inch thick in another spot. Such a board is clearly unusable in the building trade as lumber.

Another attempt to eliminate sawdust is shown and described in U.S. Patents Nos. 2,717,012, 2,919,731, and 3,044,510 issued in the name of Schneider. These patents disclose devices for slicing wood or the like using rotating circular toothless cutter blades. These devices, however, have not been successful because they are much too slow to be placed in an ordinary production line to cut wood in the dimensions as required in the lumber industry. Further, the circular blades within these apparatuses will not cut the wood in a satisfactory manner since the blades thereof tend to split these boards and cause unevenness on the cut edges thereof which reduces the usefulness of the finished board. In general, these devices are primarily used to cut soft material such as balsa wood, soft foamed plastics, and the like.

The object of this invention is to provide a method of and apparatus for cutting wood without forming wasteful sawdust.

Another object of this invention is to provide a method of and apparatus for cutting wood using a toothless cutting means that is effective in separating a board into two pieces without forming the wasteful sawdust.

Another object of this invention is to provide a method of and apparatus for cutting wood using a toothless cutting means that separates the wood or board into two pieces in a predetermined plane without splitting the same to cause unevenness and roughness in the surface portions as has been experienced in the prior art.

Another object of this invention is to reduce the frictional and wedging forces so that the knife does not bind or stick and so that the power requirements are economically feasible.

By the process of this invention, a knife blade with a sharp edge replaces the saw blade with teeth for the purpose of separating wood on a large scale basis. The frictional forces on the blade are minimized so that these values plus the wedging forces to push the wood aside to allow knife passage are within the capabilities of modern vibrators. The reduction in frictional forces is brought about by vibrating the knife, running the knife at relatively high temperature and by selecting the optimum knife cross section consistent with strength requirements. Wedging and splitting forces exerted on the wood by the knife are controlled, in part, by external pressures exerted perpendicular to the cutting direction. Splitting is also minimized by running the knife at a high temperature. The steep temperature gradient between the knife and wood causes a very rapid flow of heat into the wood, plasticizing the wood in a thin layer adjacent to the knife-wood interface making possible greater strain without fracture or splitting ahead of the knife at or near the velocity of sound, but making possible cutting or severing of wood at speed that is usually equal to the relative velocity of knife and wood. In addition to the above forces, the natural occurring molecular forces between the wood fibers, within the wood fibers and in the lignin have to be overcome. As is well known, wood is a strong material, but the cutting forces per se with a sharp edge knife has been shown to be relatively minor as compared to the frictional and wedging forces previously noted. The essence of the method is the selection of optimum values for the interrelated variables preceding the cutting operations and the use of some of these variables for controlling the process during the cutting operation to achieve the unique result of cutting wood on a large scale into commercially valuable subdivisions.

Further, it has been found that the heat created due to the frictional forces of the knife reciprocating in the wood, is dissipated into the wood because the wood is relatively cool and the heat transfer by conduction from the knife to the wood in fact cools the blade more rapidly the faster the wood is moved past the knife. Accordingly, the temperature of the knife blade can be controlled by the rate of speed that the wood is cut.

Alternately, additional heat can be added to the knife blade if needed to maintain the desired high temperature and reduce frictional forces at high cutting speeds. This can be accomplished by such means as placing a heating element on or in the blade or by passing an electric current through the blade. The blade temperature may range from 150° F. up to the point limited only by the metallurgy of the blade material and its ability to withstand the applied stresses.

Another feature of the invention is the provision for knife guidance to insure that the cut surface is plane and that the product is for uniform thickness. Due to the inhomogeneity of the wood, as the knife advances into the wood it is subject to unbalanced forces in a direction perpendicular to the knife face. These forces tend to make the knife deviate from the predetermined cutting plane. Unless this deviation is corrected when very small, the side deviating forces become so large as to cause surface unevenness or in extreme cases to bend the knife beyond its elastic limit. Knife guidance is obtained by one or a combination of the following methods. It has been found desirable to maintain the blade in a state of tension at all times. This is accomplished both by pretensioning means and by proper phasing of the blade reciprocating mechanisms. It has also been discovered that a chopping action of the blade is helpful. The knife is slightly withdrawn from cutting interface so that it may redirect itself for the next cut and thus be relieved from the side acting forces. Chopping action may be accomplished by various means but proper blade configuration and orientation is one of the simplest methods. A third effective method of knife guidance is by prescoring the faces of the board or cant being cut.

These and other objects and advantages will become manifestly clear to those skilled in the art when taken in conjunction with the detailed specification and drawings wherein:

FIGURE 1 is a perspective view of the kerfless cutter illustrating the principles of this invention.

FIGURE 2 is a perspective view of another kerfless cutter with parts shown in section illustrating the principles of this invention.

FIGURE 3 is a cross sectional view taken on line 3—3 of FIGURE 2.

FIGURE 4 is a side elevation of another embodiment of the kerfless cutting mechanism illustrating the principles of the present invention with parts broken away and shown in cross section to illustrate internal details.

Figure 5:
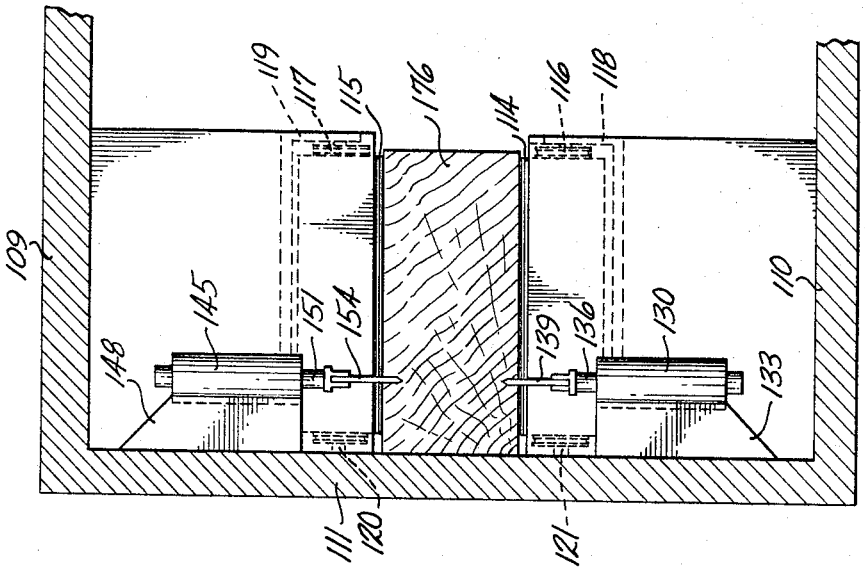
FIGURE 5 is a cross sectional view taken along line 5—5 of FIGURE 4.

Referring now to FIGURE 1 of the drawings, the kerfless cutting mechanism 31 is disclosed. The kerfless cutting mechanism 31 is provided with a supporting structure 32 having a channel 33 formed therein to present a generally U-shaped configuration. Mounted on the support structure 32 is a plurality of upper and lower feed rolls 34 that drive the cant to be cut into the cutting mechanism 31. The feed rolls 34 are mounted on shafts in the conventional manner and are driven by a chain, not shown. On the outfeed side of the cutting mechanism, a plurality of upper and lower guide rolls 36 are mounted on shafts in the conventional manner to aid in pulling the board out of the cutting mechanism. Positioned adjacent the cutting mechanism is a pair of spaced apart side pressure rolls 35 adapted to press against the side of the board to prevent the tendency of the board to be cut from splitting. The side pressure rolls 35 are mounted on rotatable shafts and engage the lateral edge of the board.

A blade member 37 is mounted in the path of the board to be cut and is connected at its upper end to an upper connecting collar 38 which in turn is connected to a shaft 42 which is driven by a power source 40. The power source 40 may be a hydraulically driven reciprocating member that is mounted on the support plate 44 which in turn is mounted on the support structure 32. The driving means 40 may be in the form of a hydraulic reciprocating mechanism manufactured by the Dynex Company of Pewaukee, Wis.

The lower end of the blade 37 is connected to a lower connecting collar 39 which in turn is connected to a reciprocating shaft 43 driven by a lower power mechanism 41. The power source 41 may take the same form as the power source of the upper member 40. The lower power mechanism 41 is mounted on a support plate 45 mounted on the support structure 32. It should be noted that in this instance the axis through the upper and lower power mechanisms is inclined from the perpendicular with respect to the longitudinal axis of the board being cut.

In operation, the upper and lower driving members 40 and 41 are actuated to reciprocate the blade 37 in the direction of the arrow as shown in FIGURE 1. In addition to the force necessary to reciprocate the blade 37, there is an overriding pretensioning force continuously applied through the driving members 40 and 41 so that the blade 37 is held in tension at all times. After the power mechanisms 40 and 41 have been activated, a board is fed into the path of the cutting blade 37 in the manner as shown in FIGURE 1 and cut into two pieces. It should be pointed out that the upper and lower driving means reciprocates the blade 37 up to 50 cycles per second at a stroke of up to 1 inch.

Referring now to FIGURES 2 and 3, another form of the kerfless cutter mechanism is illustrated and indicated by the numeral 46. This form of the invention is provided with a supporting frame having vertical posts 47 and spaced apart horizontal posts or rails 48. Rigidly mounted on the frame structure is a feed table indicated at 49 having a vertical portion 51 and a horizontal portion 50. Guide slides 52 are provided at the infeed portion of the table mounted on support post 53 which in turn are mounted or rigidly connected to side support strap 54. Positioned also on the infeed section is a plurality of feed rolls 55 mounted on brackets 56 to feed the board to be cut into the cutting mechanism.

Mounted adjacent to the cutter blades 75 and 78 is a plurality of side pressure rolls 57 mounted on brackets 58 by shaft 59. The side pressure rolls 57 are designed to provide adequate side pressure on the board to be fed while the same is being cut to prevent splitting of the board during the cutting thereof.

An upper arm 60 is rigidly connected to a channel member 62 which is provided with a cylindrical eye member 63 welded thereto at 66. The cylindrical eye portion 63 is fitted between a pair of yoke members 64 which are rigidly mounted by a plate member to the upper crossarm 48. The cylindrical eye is rotatably connected to the yoke members by the shaft 67 so that the arm may rotate thereon. At the opposite end of the arm 60 an extension 68 is provided for a purpose to be hereinafter set forth.

A lower arm member 61 is rigidly mounted to a channel member 73 which is in turn rigidly mounted to a cylindrical eye member 71 that fits between yoke members 70 and is rotated on a shaft 72 extending through the yoke 70 and the cylindrical eye 71. The yoke member 70 is rigidly mounted to the crosspost 48 by a support plate 69.

The opposite end of the lower arm member 61 is provided with an extension member 74 for a purpose to be hereinafter set forth.

The upper arm member 60 is provided with a blade member 75 secured thereto by connecting means 77. The blade 75 is provided with cutting edge 76. The lower arm member 61 is provided with a balde member 78 having a cutting edge 79 thereon that is rigidly connected to the lower arm member 61 by connecting means 80. The blade member 78 extends through an opening 78' in the saw table portion 50. It should be noted that the upper and lower cutter blades are mounted directly above and below one another so that the entire board will be cut as it is passed between the blades.

The upper arm member 60 is driven or oscillated in a pivotal action around the shaft 67 by a motor means, not shown, which drives a chain member 100 that extends around a sprocket 98 having teeth 99 thereon which in turn is connected to a shaft crank 89 which reciprocates a pair of tie rods 85 and 86. The upper end of the tie rod 85 is provided with an eye 83 which is connected to a shaft member 81 with the tie rod 86 being provided with an eye member 82 and connected to the shaft 81. The shaft 81 is in turn welded or otherwise connected to the upper arm member 60 at 84. The lower portion of the tie rods 85 and 86 are provided with additional eyes 87 and 88 which extend around shaft 89. It should be noted that the shaft 89 is provided with eccentric portions for a purpose to be hereinafter set forth. Accordingly, as the shaft 89 is rotated by the power source, the tie rod members 85 and 86 reciprocate in a vertical direction, which in turn reciprocates the upper arm member 60.

The lower arm member 61 is reciprocated by the same power source by being connected to the shaft 89 by tie rods 93 and 94 having eye members 91 and 92 thereon. The eye members 91 and 92 extend around a shaft 90 which is in turn connected to the lower arm member 61. The lower portion of the tie rods 93 and 94 are provided with additional eyes 95 and 96 which extend around another eccentric portion of the shaft 89 to drive the same. The shaft 89 is mounted on the usual bearing members on base supports 97 and are connected to the floor or other support member.

The upper arm member 60 is provided with an upper stabilizer arm 101 having an extension 102 extending downwardly therefrom. The extension 102 is provided with a slot section 103 which receives the extension 68 on the upper arm 60 to prevent any lateral motion of the arm member 60. Likewise, the lower arm member 61 is provided with a lower stabilizer 104 provided with an upper extension 105 having a slot 106 therein which receives the extension 74 on the lower arm member 61 to prevent any lateral motion of the arm member 61.

In operation, the power source, not shown, is actuated to drive the chain 100 which drives the sprocket 98 to rotate the shaft 89. As the shaft 89 rotates, upper and lower arms 60 and 61 respectively will be reciprocated in a vertical direction due to the eccentric connection of the tie rods 85, 86, 93 and 94 with the drive shaft 89. It should be noted that the upper arm 60 and lower arm 61 are reciprocated at a frequency up to 60 cycles per second and at a stroke up to 0.3125 inch. Further, it should be noted that the upper and lower arms 60 and 61 respectively reciprocate in such a manner that when the upper arm is traveling in an upward direction, the lower arm is traveling in a downward direction. In this manner, the blades 75 and 78 work in unison to cut the board member. After the power mechanism has been actuated, the board member to be cut is fed into the infeed section with one lateral edge thereof abutting the vertical portion 51 of the saw table 49. As the board member advances toward the cutter blades 75 and 78, the side pressure rollers 57 will exert a side pressure thereon to prevent the board from splitting when the blades 75 and 78 cut the board into two pieces.

Figure 6:
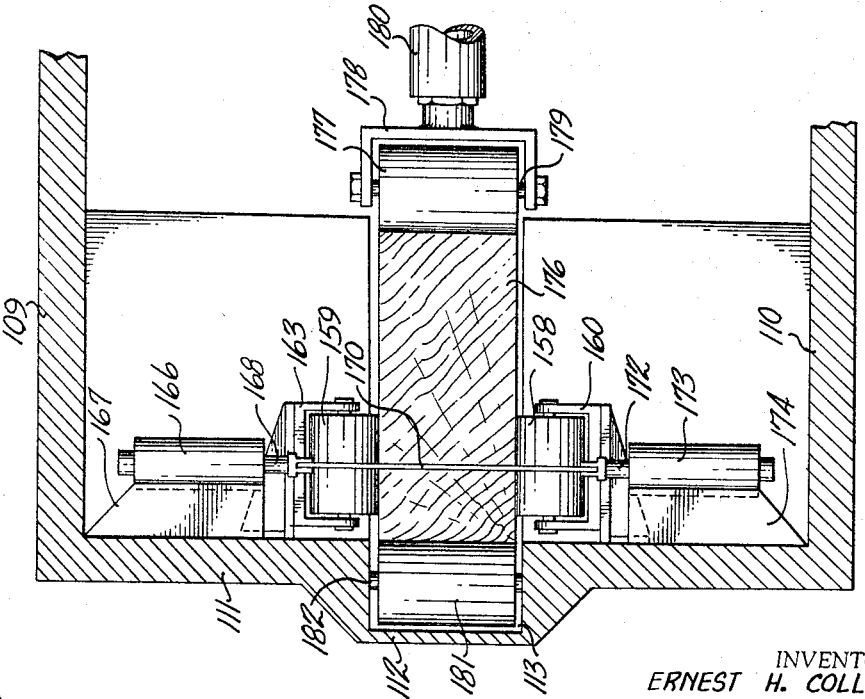
FIGURE 6 is a cross sectional view taken on line 6—6 of FIGURE 4.

Referring no to FIGURES 4 to 6 inclusive, another form of the kerfless cutter is indicated at 107. The kerfless cutter mechanism 107 is provided with a supporting frame 108 having an upper portion 109 and a lower portion 110 connected by a vertical portion 111. The vertical portion 111 is provided wtih an enlargement 112 having a recess 113 therein.

At the infeed side of the kerfless cutting mechanism 107 is mounted a plurality of lower feed rolls 114 on support arms 118 by shafts 121. The lower feed rolls 114 are driven by chain members 116. Positioned directly above the lower feed rolls 114 is a plurality of upper feed rolls 115 mounted on supporting arms 119 by shafts 120. The feed rolls 115 are driven by chain members 117. The upper and lower feed rolls 114 and 115 function together to feed a board 176 through the kerfless cutting mechanism.

At the outfeed side of the kerfless cutter mechanism 107 is mounted a plurality of power driven lower guide rolls 122 on support arms 124 by shafts 126. Mounted directly above the lower guide rolls 122 is a plurality of upper guide rolls 123 mounted on support arms 125 by shafts 127. The upper and lower guide rolls 122 and 123 driven by chains 125' and 126' function together to guide and pull the board 176 out of the kerfless cutting mechanism 107 after the same has been cut.

A plurality of lower driving means 128, 129, and 130 are mounted on the frame by plates 131, 132, and 133 respectively. Each of the lower driving means is provided with shafts 134, 135, 136 with blades 137, 138, and 139 mounted on the shafts by connecting means 140, 141, and 142 connected thereto to an intermediate, elongated bar mechanism 142' so that the blade members 137, 138, and 139 function in unison. It should be noted that the blades are successively longer than each other so that each will cut successively deeper prior to the main cutting of the board by the blade 170.

Positioned directly above the lower driving mechanism is a plurality of upper driving mechanisms 143, 144, and 145, each mounted on the frame by a support plate 146, 147, and 148, respectively. The upper driving means is connected to blades 152, 153, and 154, respectively, by shafts 149, 150, and 151 by connecting means 155, 156, and 157 connected to an intermediate bar mechanism 157' so that the respective blades will work in unison. Also, in this instance, each of the blades is successively longer than the other so that a successively deeper groove is formed in the board 176 prior to the final cutting of the board by the blade 170.

While a plurality of upper and lower prescoring blades have been shown and described, it will be appreciated that other types of prescoring means may be employed including any number of prescoring means having other design cutting mechanisms.

The blade 170 that finally cuts the board 176 is provided with a cutting edge 175 and may be provided with a generally V-shaped configuration on its leading edge thereof. The blade 170 is driven by an upper driving means 166 and a lower driving means 173. The upper driving means 166 is supported on the frame 108 by a support plate 167. The lower driving means 173 is supported on the frame 108 by a support plate 174. The upper driving means 166 is connected to the blade 170 by a shaft 168 and a connecting means 169. The lower driving means 173 is connected to the blade 170 by a shaft 172 by connecting means 171. The upper and lower driving means 166 and 173 respectively are of the reciprocating type capable of reciprocating the blade 170 in a vertice direction at up to 60 cycles per second and at a stroke of up to one inch. Likewise, the upper and lower driving means 166 and 173 respectively, also apply the overriding pretensioning force to the blade 170. Further, the upper driving means 143, 144, and 145 and the lower driving means 128, 129 and 130 may be of the reciprocating type to reciprocate the respective blade members at a stroke of up to one inch and up to 60 cycles per second frequency.

Positioned intermediate the main cutting blade 170 and the partial cutter means are upper and lower guide rolls 158 and 159. The lower guide roll 158 is mounted on a support arm 160 by shaft 161. The arm 160 is supported on the frame by a support plate 162. The upper guide roll 159 is mounted on a support arm 163 by a shaft 164. The support arm 163 is supported on the frame 108 by a support plate 165.

Side pressure rolls 177 and 181 are provided to maintain a side pressure on the board 176 as it is being cut. The side pressure roll 181 is mounted in recess 113 in the vertical portion of the frame 111. The side pressure roll 181 is mounted on a shaft 182 within the recess 113. It should be noted that a plurality of side pressure rolls may be provided in a vertical plane if desired. The side pressure roll 177 is mounted on a shaft 179 which in turn is mounted on a yoke member 178. The yoke member 178 is mounted on a ram structure 180 to provide variable pressure on the side of the board 176. The ram structure 180 is connected to a hydraulic cylinder means, not shown, to provide such variable lateral pressure. It should be noted that a plurality of side pressure rolls 177 may be provided in a vertical plane as shown in FIGURE 8 if desired.

In operation, the driving means 166 and 173 are actuated to reciprocate the blade 170 in a vertical direction. It has been found desirable that the upper and lower driving mechanism 166, 173, respectively, should also apply the overriding pretensioning force to the blade 170. In this manner, the blade 170 is always in tension which provides for a more accurate cut through the board 176. Next, the upper driving mechanisms 143, 144, 145 are actuated to drive the blades 152, 153, and 154. Simultaneously therewith, the lower driving mechanisms 128, 129, and 130 are actuated to drive the blades 137, 138 and 139. It should be pointed out that each of the blades 137, 138, 139, 152, 153, 154, and 170 all cut in the same plane. Next the chain mechanisms 117 and 116 are actuated to actuate the drive rolls 114 and 115. Also, outfeed chains 125' and 126' are actuated to drive rolls 122 and 123. Thereafter, a cant 176 is fed into the cutter mechanism and cut along the line as shown in FIGURES 7 and 8.

Figures 7, 8:
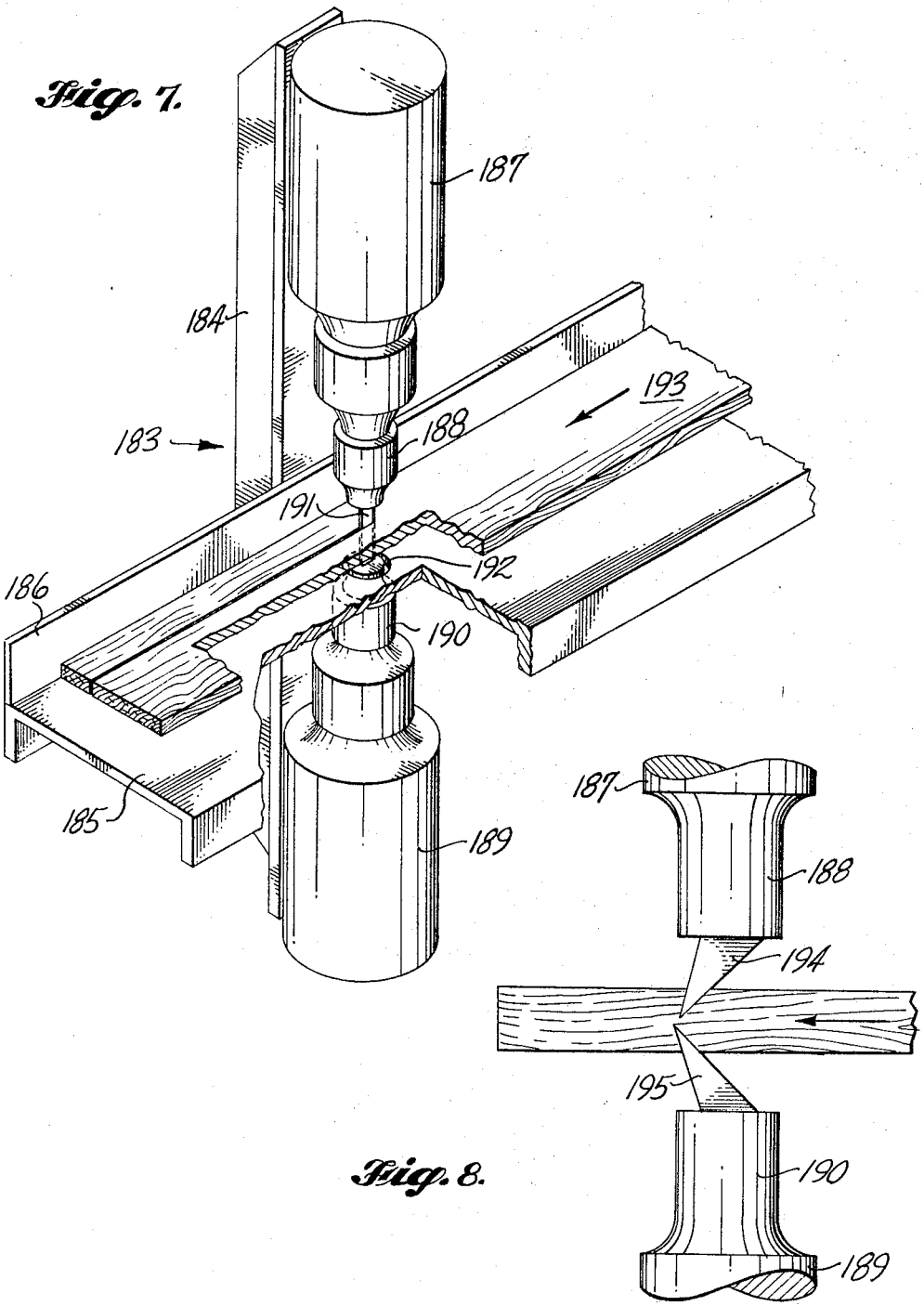
FIGURE 7 is a perspective view of another embodiment of the kerfless cutting mechanism with parts broken away and shown in cross section to show internal details.
FIGURE 8 is a detail view of another cutting mechanism usable with the kerfless cutting mechanism of FIGURE 7.

Referring now to FIGURES 7 and 8, another form of the kerfless cutting mechanism is indicated at 183. The kerfless cutting mechanism 183 is supported on a frame structure 184 which has connected thereto a table structure 185 having an upper lateral guide 186. The guide 186 is adapted to have one lateral edge of the board 193 slide thereagainst.

An upper driving mechanism 187 is rigidly mounted on the support frame 184 and a lower driving mechanism 189 is mounted on the support frame 184 also. The upper and lower driving mechanisms 187 and 189 are of the type which are provided with a conventional generator mechanism to reciprocate a blade 191 at a frequency range up to 25,000 cycles per second and at a stroke of at least .006 inch. The cutter blade 191 is connected to the upper driving mechanism 187 by a chuck mechanism 188. The blade 191 is connected on the lower driving mechanism 189 by a chuck 190. It should be noted that the table mechanism 185 is provided with an opening 192 therethrough in which the blade 191 extends.

In operation, the upper and lower driving mechanisms 187 and 189 are actuated to oscillate the blade 191 at the desired frequency and amplitude. Thereafter a board 193 is fed on the table 185 past the cutter blade 191 to cut the same in two pieces.

Referring now to FIGURE 8, another type of blade structure is indicated for the ultrasonic cutting means 183 of FIGURE 7. In this instance, the upper chuck mechanism 188 of the upper driving mechanism 187 is provided with a blade 194 which extends approximately half way through the board. Also, the lower driving mechanism 189 is provided with a blade 195 connected to the chuck mechanism 190 and extends approximately into the middle of the board. The length of the blades 194 and 195 are so selected that the board is cut entirely through when the upper and lower driving mechanisms are reciprocated.

While specific details of preferred embodiments have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. A method for severing wood, comprising: reciprocating a knife means at a predetermined frequency and stroke; passing the knife means through the wood to be severed with a chopping action between the wood and knife means; regulating the temperature of the knife means by the speed of the wood moving relative to the knife means.

2. A method for severing wood in accordance with claim 1 wherein the frequency of the reciprocating knife means may be up to 25,000 cycles/sec.

3. A method for severing wood in accordance with claim 1 wherein the stroke of the reciprocating knife means may be up to 1".

4. A method for severing wood in accordance with claim 1 wherein the frequency of the reciprocating knife means may be up to 25,000 cycles/sec. and the stroke may be up to 1".

5. A method for severing wood in accordance with claim 1 wherein said knife means is pretensioned.

6. A method for severing wood, comprising: reciprocating a knife means at a predetermined frequency and stroke; passing the knife means through the wood to be severed with a chopping action between the wood and knife means; exerting a force on the wood to be severed in a plane perpendicular to the plane of the reciprocating knife means passing through the wood at a position just ahead of the juncture of the knife means and wood; regulating the temperature of the knife means by the speed of the wood passing through the knife means.

7. A method for severing wood in accordance with claim 6 wherein the wood is partially severed by blade means prior to being severed by said knife means.

References Cited

UNITED STATES PATENTS 3,044,510  7/1962  Schneider _____ 144—175 X
3,265,103  8/1966  Hervey _____ 144—170

FOREIGN PATENTS 969,320  12/1950  France.
723,816  2/1955  Great Britain.

WILLIAM W. DYER, Jr., *Primary Examiner.*

R. J. ZLOTNIK, *Assistant Examiner.*